March 15, 1927. 1,621,143
H. E. R. VOGEL
PROCESS FOR BRINGING ABOUT PHYSICAL AND CHEMICAL CHANGES IN
DIELECTRIC CARBON COMPOUNDS BY MEANS OF IONIZED GASES
Filed April 8, 1925 2 Sheets-Sheet 1

Inventor
H.E.R.Vogel,
By
Marks Clerk
Attys.

Patented Mar. 15, 1927.

1,621,143

UNITED STATES PATENT OFFICE.

HANS EDGAR RICHARD VOGEL, OF BLANKENESE, NEAR HAMBURG, GERMANY.

PROCESS FOR BRINGING ABOUT PHYSICAL AND CHEMICAL CHANGES IN DIELECTRIC CARBON COMPOUNDS BY MEANS OF IONIZED GASES.

Application filed April 8, 1925, Serial No. 21,654, and in Germany March 26, 1920.

It is known that gases by various means and according to various processes can be charged with energy in a characteristic manner and thereby be enabled to exert special influences of a physical and chemical nature. This treatment, which is designated ionization of the gases, is turned to account in technology in a great variety of ways, for example for the purpose of effecting additions and other chemical and physical changes in dielectric carbon compounds. A process founded on this basis is known for increasing the viscosity of suitable oils or oily liquids, which flow in a thin layer over the plates of a condenser in the presence of gases, by employing a moderate electrical pressure of about 400 volts. In a similar manner reactive gases, such as hydrogen, are linked on to unsaturated compounds.

In contrast to the known process, the carbon compounds according to the process forming the subject matter of the present invention are treated in a liquid or dissolved condition with ionized gases, in such a manner that powerful ionizing media are allowed to act on the mixture of the liquid with the gases in as molecular a distribution as possible of the constituents, for the purpose of obtaining molecular changes of the carbon compounds. The ionizing medium preferably employed is an alternating current of high voltage, and, in particular cases, also of high frequency. The intimate mixing of the liquid with the gases is effected by spraying or by frothing.

In the application of alternating current of high voltage as an ionizing medium for the gas finely distributed in the liquid, not only the most economical utilization of the energy expended is attained relatively to the effect, but new working results also become possible, which were unknown and also unattainable for the processes hitherto employed.

According to the special chemical and physical action which is to be attained, either inert gases or gases that co-operate in the reaction are utilized in the new process. The temperature and pressure relations, the ratio of the quantity of energy to the material to be worked, and the duration of the action, in so far as they are not already fixed by the working conditions, are determined in advance experimentally.

According to the above, various possibilities suggest themselves under a variety of working conditions, which are hereinafter explained generally.

(1) Into a vessel provided with apparatus for the electrical ionization of gases, in which nitrogen or some other non-reactive gas is placed, paraffins are sprayed or introduced in the form of froth. Through the medium of a high-voltage alternating current the gas is ionized, so that the gas particles can act on the finely distributed carbon compound. Due to this, polymerization and an increase in the viscosity of the paraffin occurs.

In the case of the method of working hitherto employed the polymerization takes place mainly in the uppermost layers, which are exposed to contact with the ionized gas, and it is then easily carried further than is desired, so that solid products separate out, while the remainder of the oil has still not acquired the highest attainable viscosity. This objection is removed by the new process, according to the working conditions of which, the viscosity is increased to its best point, uniformly throughout the mass of the material.

(2) In to a vessel provided with apparatus for the electrical ionization of gases, in which unsaturated glycerides of the fatty acids or unsaturated fatty acids are sprayed, hydrogen is admitted, and the intimate mixture of hydrogen and hydrocarbon is exposed to the action of an alternating current of high voltage and high frequency. With a comparatively small expenditure of energy, the hydrogen links itself on to the unsaturated compound. The supply of hydrogen and unsaturated compound and the saturation process must be so regulated that overheating as a result of the exothermic reaction is obviated.

(3) A vessel provided with apparatus for the electrical ionization of gases, is filled with a liquid carbon compound to be subjected to oxidation, for example an alcohol, an aldehyde, a methylated hydrocarbon or the like; and the remainder of the vessel is filled with oxygen. An electric field is now allowed to act on the oxygen and the liquid is frothed up by introducing finely distributed oxygen. Any of the mixture that froths over, is led back again into the vessel. The working conditions are so regulated, with cooling if circumstances call for it, that the linking on of oxygen takes place up to the desired degree of reaction without combustion.

In comparison with the known process, there is also the advantage that with a comparatively simple piece of apparatus, large quantities of the material can be worked in the required manner.

In the accompanying drawing are illustrated a few forms of the apparatus, which are hereinafter described in conjunction with examples for the carrying out of the process.

Figure 1:
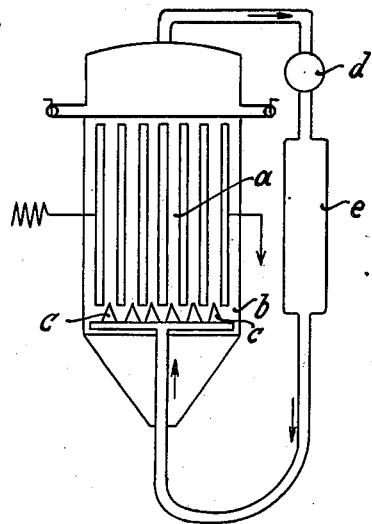
Fig. 1 is a vertical sectional view of one form of the apparatus.

The device shown in section in Figure 1, has a plate condenser $a$, the plates of which are coated with a thin insulating mass (oiled paper, enamel or the like), and the casing of the condenser is filled with the liquid $b$ to be treated, oil for example. Thereupon an alternating-current of high ionizing power is applied, and a current of gas is passed through the fine distributing nozzles $c, c$ into the liquid. There occurs an active formation of froth, which shows that chemico-physical changes are taking place in the dielectric liquid. The gas, after leaving the liquid froth, is brought, by the pump $d$, into the chamber $e$, from which it passes through the nozzles $c, c$ back into the liquid.

Figure 2:
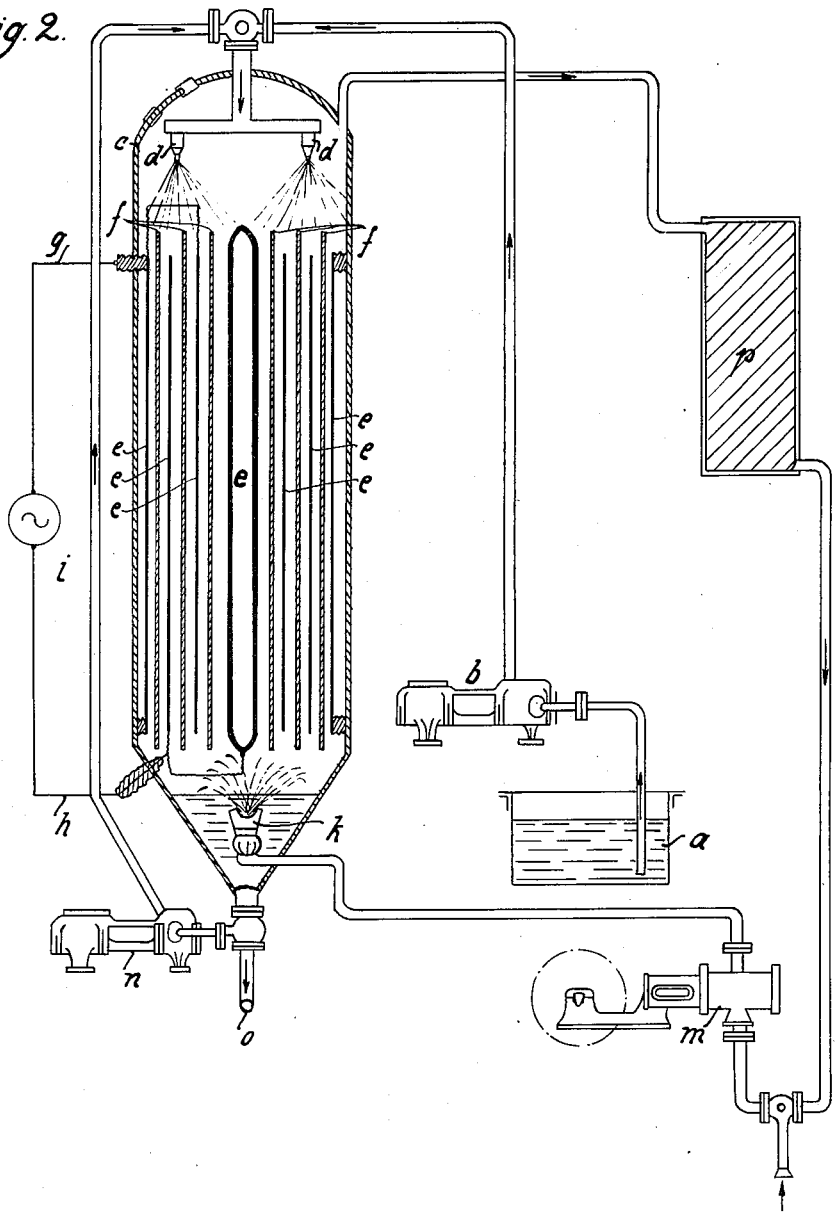

Figure 2 shows in section a device which is employed for example for increasing the viscosity of oils. The gas ions of high energy charge and high velocity are here allowed to act on the fine particles of the oil sprayed in the form of a mist, a gas being employed that does not attack the oil, or only attacks it to the smallest possible extent, such as nitrogen or carbonic acid.

First of all, the material to be treated is charged into a tank $a'$, from which it is passed by the feed pump $b$ into the cylinder $c'$, which is provided with a heating jacket (not shown), the cylinder being constructed in the manner of the autoclaves used in the fat-hardening processes, which work on the counter-current principle. At the point where the oil enters, the cylinder is provided with atomizing nozzles $d', d'$ which are arranged in a circle. The mists of oil now pass between the coatings of a tubular condenser, which in the drawing consists of four concentric metal tubes $e', e', e', e'$, the walls of which are separated by somewhat longer insulating tubes $f', f', f'$. These insulating tubes are to prevent marginal actions when the alternating current passes. The metal tubes are connected alternately with one another and by leads $g'$ and $h'$ with the poles of a source $i$ of high-voltage alternating current of high periodicity and great current strength. Under the ionizing influence of the alternating current, the mists of oil condense in the lower part of the condenser, and the oil that has been treated flows into the conical part of the cylinder. Here a further nozzle $k$ is fitted out of which the ionizing gas, drawn in and compressed to a high pressure by the compressor $m$, is discharged with great force and sprays the already condensed oil back into the condenser chamber. When sufficient oil has collected in the lower part it can be transferred by the pump $n$ into the cylinder $c$ again or into a second similar apparatus and atomized. After the termination of the action, it is drawn off through the discharge cock $o$.

The ionizing gas leaves the cylinder $c'$ at the top through a pipe $p'$, passes through a purifying tower $p$, and is then again drawn into the compressor $m$ by suction.

Figure 3:
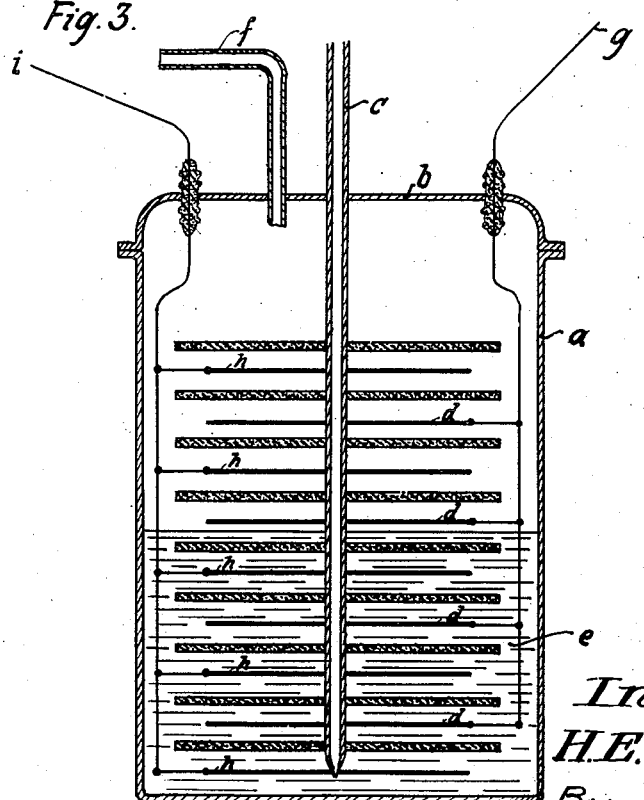
Figs. 2 and 3 are similar views of modifications.

Special advantages for the carrying out of the process forming the subject-matter of the invention are possessed by the apparatus which is shown in section in Figure 3. It consists of a metallic vessel $a^2$, through the cover $b^2$ of which extends a gas-supply pipe $c^2$. The electrodes $d^2$ are connected by a wire lead $g^2$ with one pole of the high-tension source (not shown) and the electrodes $h^2$ by a wire lead $i^2$ with the other pole thereof. The pipe $f^2$ extending through the cover of the vessel, leads to a vacuum chamber. The vessel $a^2$ is filled with the liquid $e^2$, which may for example be oil. Through $c^2$ a current of gas, air for example, is passed into the liquid $e^2$. The space between the pairs of electrodes which are separated from one another by insulating plates $x$, fills, upon the passing of the current of gas, with the frothing liquid. The gas particles are thus ionized, and this brings about the desired reaction upon the liquid.

The special advantage of this form of the apparatus lies in the fact that the danger of penetrating the insulating plates is diminished, and the interruptions of working that would otherwise occur rather often, in consequence of the damaging of the insulating plates, are better obviated, as the dielectric liquid itself acts as an insulating layer.

In the foregoing several ways of applying the new process have been described, among which is the application thereof for the purpose of increasing the viscosity of oils (lubricating oil). Out of a series of 34 manufacturing supervisions relating to the polymerization of oil according to the processes already known, by means of glow discharges in drum apparatus with axially fixed plate condensers rotatably movable therethrough and arranged for the sprinkling by means of the liquid supplied, for increasing the viscosity of 102 tons of a lubricating oil of 6,8° Engler at 50° Centigrade to about 20° Engler at 50° C., a current-consumption of 322,000 kilowatt-hours was computed, and from this a usefulness number, according to a predetermined unit value, at 0.15. In the case of this manufacture, the driving motor drives a generator of 500 periods with an efficiency of about 80 per cent, so that for the generator, on the basis of this usefulness number of 0.15, an efficiency of 0.19 is yielded. The same oil was brought according to the process of the present invention to the same final viscosity with the closest possible maintenance of the other physical conditions by employing apparatus as illustrated in the Figure 1. The efficiency for the generator could be raised up to 0.238, so a saving of energy of about 25 per cent. was obtained. This materially better utilization of the energy is the result of the essentially more favourable surface distribution of the oil and of the gas ions of higher energy charge and greater velocity.

Equally favourable actions are obtained according to the new process in the case of the treatment of liquid hydrocarbons, such as brown-coal tar oil, paraffin oil and the like, with oxygen or gases containing oxygen or giving up oxygen, for the purpose of producing saponifiable fats. A gas that yields oxygen in the case of this treatment is carbon dioxide. Here again the action depends on the high energy charge of the gas particles, the most extensive surface distribution of the liquid material and the rapid exchange of the liquid particles met by the ionized gases.

A special application of the new process, consists in converting petroleum jelly or similar soft hydrocarbons in the presence of oxygen into fat-like substances which, upon being spread while warm, on the skin for example, evolve oxygen. This product is applicable for medicinal purposes. The disinfecting properties are enhanced by a percentage of aldehyde-like compounds, which are produced at the same time, by the action of the ionized gases on the molten hydrocarbon according to the present invention and are dissolved therein.

Furthermore it has also been found that by applying the new process with a small percentage of conducting compounds in the dielectric liquids, actions can be attained which are valuable for technical purposes.

A special case concerns the electrical treatment of liquid varnishes for the purpose of increasing their drying properties. The liquid varnish, which may contain metallic siccatives, is brought to a froth in the presence of gases by the action of the alternating current discharges, and is treated in this manner until a varninshing liquid results that dries easily after being applied. The gases may be either chemically active or inactive; or mixtures of active and inactive gases may even co-operate. The selection of the gases, the strength of the alternating current, and the duration of the action of the discharges, are adapted for the various sorts of varnish to the object to be attained, on the basis of preliminary systematic experiments. For carrying out this process, the apparatus according to Figure 3 is preferably utilized.

In comparison with the state of the art as given by the processes hitherto known, in the process forming the subject-matter of the present invention, by the union of the two means: intimate mixing, as molecular as possible, of gas and liquid dielectric carbon compounds on the one hand and the employment of high energy charges and high velocity of the gas ions obtained by the stronger ionization media on the other hand, the following technical advantages are obtained:—

(1) the possibility of employing substantially smaller pieces of apparatus;
(2) the possibility of working without employing high pressure and high temperatures;
(3) consequently great economy in the apparatus;
(4) increasing the safety of working;
(5) uniform progress of the reaction;
(6) the possibility of carrying on the reactions to a point otherwise unattainable.

In the case of many methods of applying the new process, gases from the dielectric carbon compounds become free, for example hydrogen, which then also co-operates, so that an intimate foaming mixture of the liquid and the gas is produced, upon which the strongly ionizing media act.

What I claim is:—

A process for electrically treating carbon compounds which comprises passing carbon compounds in the form of froth together with a gas through a condenser, the plates of which are separately provided with a dielectric and passing a high voltage, high current density discharge between said plates and through said mixture of carbon compounds and gas to cause molecular changes in the said carbon compounds.

In testimony whereof I affix my signature.

Dr. HANS EDGAR RICHARD VOGEL.